United States Patent [19]

Shackleton

[11] Patent Number: 5,132,941
[45] Date of Patent: Jul. 21, 1992

[54] METHOD AND APPARATUS FOR SENSING SOUND WAVES IN A FLUID MEDIUM

[75] Inventor: James R. Shackleton, Orange, Calif.

[73] Assignee: Hughes Aircraft Company, Los Angeles, Calif.

[21] Appl. No.: 719,104

[22] Filed: Jun. 21, 1991

Related U.S. Application Data

[63] Continuation of Ser. No. 447,777, Dec. 8, 1989, abandoned.

[51] Int. Cl.⁵ ............................................. H04R 1/02
[52] U.S. Cl. .................................. 367/149; 367/172; 250/227.17; 385/123; 359/285
[58] Field of Search ............... 367/140, 141, 149, 167, 367/172; 250/227.17, 227.19, 227.24, 227.25; 356/345; 73/655–657; 350/96.28, 96.29, 96.3–96.34

[56] References Cited

U.S. PATENT DOCUMENTS

| | | | |
|---|---|---|---|
| 4,322,829 | 3/1982 | Davis, Jr. et al. | 367/149 X |
| 4,442,350 | 4/1984 | Rashleigh | 250/227.17 |
| 4,593,385 | 6/1986 | Chamuel | 367/149 |
| 4,868,799 | 9/1989 | Massa | 367/172 |
| 4,922,095 | 5/1990 | Gergely | 250/227.17 |
| 4,951,271 | 8/1990 | Garrett et al. | 367/149 |

Primary Examiner—Brian S. Steinberger
Attorney, Agent, or Firm—Wanda K. Denison-Low

[57] ABSTRACT

A method and apparatus (10) for sensing sound in a fluid medium. The apparatus (10) includes an element (12) for generating polarized light having a predetermined plane of polarization. In addition, the apparatus (10) further includes an element (14) for rotating the plane of polarized light in response to sound waves propagating in the fluid medium, as well as an element (32) for detecting the polarized light. Finally, the apparatus (10) includes an element (34) for generating a signal from the output of the detecting element (32) which is indicative of the amplitude and frequency of the sound waves.

12 Claims, 3 Drawing Sheets

METHOD AND APPARATUS FOR SENSING SOUND WAVES IN A FLUID MEDIUM

This is a continuation of application Ser. No. 447,777, filed Dec. 8, 1989 now abandoned.

BACKGROUND OF THE INVENTION

1. Technical Field

This invention relates to the field of sound transducers, and more particularly to a method and apparatus for sensing sound waves in a fluid medium.

2. Description of Related Art

Hydrophones are transducers which generate an output in response to sound waves which are propagating through a fluid medium. Because they are able to detect sound waves in this manner, they often are used in a wide variety of applications. When used in seismic exploration, an array of hydrophones are generally towed by a ship. In addition to the array of hydrophones, the ship generally tows a sound source which emits periodic pulses of acoustic energy. These pulses emitted by the sound source travel through the water and are reflected back to the array of hydrophones from the interfaces between the layers of sediment and rock. After the reflected pulses are received by the hydrophones, the outputs from the hydrophones are amplified and processed so as to produce a cross-sectional view of the sediments on the ocean floor.

Hydrophones may also be used in underwater communication where direct wire links are disadvantageous and radio wave propagation is generally difficult. In such underwater communication, a carrier wave of a fixed frequency is amplitude modulated by a voice signal. The modulated signal is delivered to a projector which is used to emit sound waves in water in response to the modulated signal. A hydrophone is then used to receive the sound waves generated by the projector. The output of the hydrophone is then demodulated so that the original voice signal may be reproduced.

Finally, hydrophones may be used to detect the presence of submarines. When used for this purpose, a linear array of hydrophones are generally towed behind a ship. Each of the hydrophones in the array attempt to sense sound which may indicate the presence of a submarine.

While operation of hydrophones will vary depending on the specific structure used as well as the nature of the application, perhaps the most general approach to hydrophone operation is as follows. When sound waves encounter a hydrophone, they are delivered to an electrorestrictive material such as barium titanate and lead metaniobate. These electrorestrictive materials have the property that they generate an electric voltage when they are deformed by the force induced by the sound waves acting on the hydrophone. By measuring the voltage generated by the electrorestrictive material, a signal responsive to the sound waves may be generated.

There are several disadvantages which are often associated with the type of hydrophone described above. Since they often involve a relatively large number of metal components, this type of hydrophone is often susceptible to failure due to excessive corrosion. In addition, such hydrophones are often limited in terms of the static and dynamic pressure ranges in which they can operate, as well as in terms of frequency response. Further, because such hydrophones have a relatively large number of components, they are often relatively expensive. Finally, because such hydrophones often generate an electrical signal by electromechanical techniques, they often generate a pulse of sound when they are activated which may jeopardize security in an otherwise secure environment.

SUMMARY OF THE INVENTION

According to the preferred embodiment of the present invention, a method and apparatus for sensing sound waves in a fluid medium is disclosed. The apparatus includes an element for generating polarized light having a predetermined plane of polarization. In addition, the apparatus further comprises an element for rotating the plane of polarization in response to sound waves propagating in the fluid medium, as well as an element for detecting the amount of rotation of the plane of polarization. Finally, the apparatus includes means for generating a signal from the output of the detecting element which is indicative of the amplitude and frequency of the sound waves.

BRIEF DESCRIPTION OF THE DRAWINGS

The various advantages of the present invention will become further apparent to those skilled in the art after reading the following description of the preferred embodiment and by reference to the drawings in which.

DESCRIPTION OF THE PREFERRED EMBODIMENT

Figure 1:
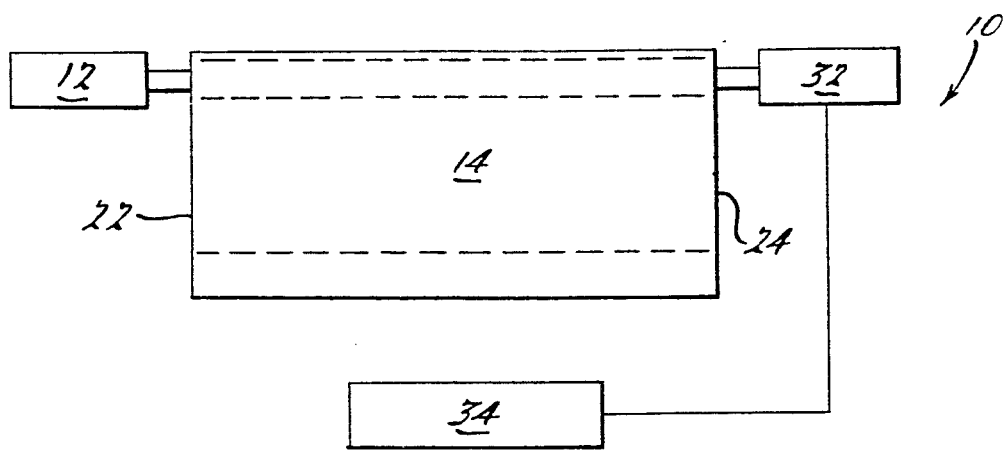
FIG. 1 is a diagrammatic illustration of the preferred embodiment of the invention.

Referring now to FIG. 1, an apparatus for sensing sound waves in a fluid medium is shown which is generally designated by the numeral 10. The apparatus 10 may be used in connection with seismic exploration, underwater communications, as well as submarine detection. It is to be understood, however, that the apparatus 10 may be used in other suitable applications as well. The apparatus 10 may typically be disposed in a fluid medium such as water during operation, and detects sound waves propagating through the fluid medium by rotating the plane of polarization of a beam of polarized light in the manner described below.

To provide means for generating polarized light, a polarized light source 12 is provided. The polarized light source 12 generates polarized light having a plane of polarization which is oriented in a predetermined known direction. Various means for generating polarized light are known in the art. For example, the source of polarized light may be a laser. It is to be understood, however, that other suitable means for generating polarized light may be used.

To provide means for rotating the plane of polarization of the polarized light emitted by the polarized light source 12, a polarized light rotator 14 is provided. The polarized light rotator 14 is substantially cylindrically shaped with a C-shaped cross-section. The substantially cylindrical shape of the polarized light rotator 14 defines a substantially annular inner surface 16 and a substantially annular outer surface 18 as well as an axial centerline 20. The substantially annular inner surface 16 and the substantially annular outer surface 18 extend from a first cross-sectional end surface 22 which defines one end of the polarized light rotator 14 to a second cross-sectional end surface 24 which defines the second end of the polarized light rotator 14.

Figure 3:
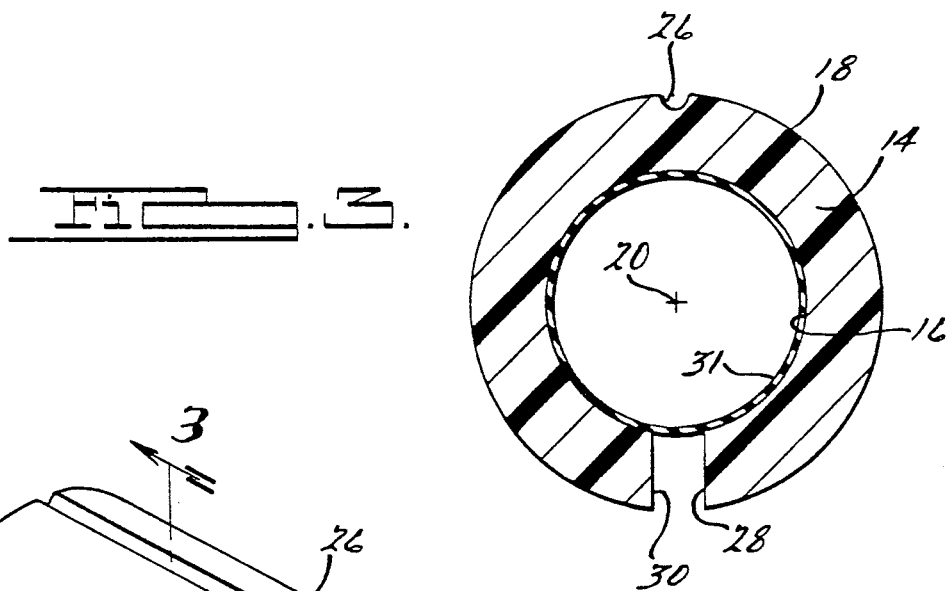
FIG. 3 is a cross-sectional view of the polarized light rotator taken along the line 3—3 in FIG. 1.
Figure 2:
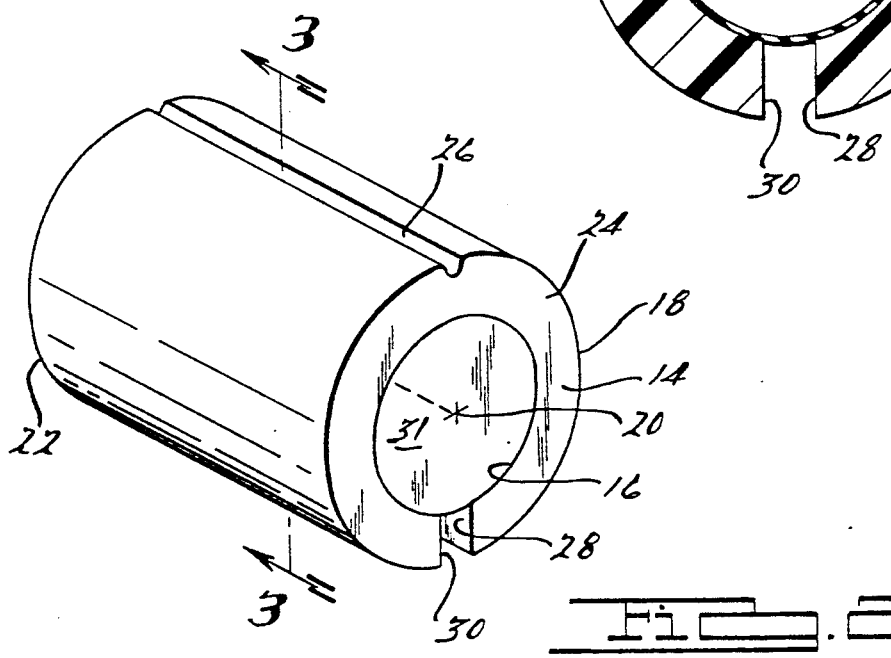
FIG. 2 is an elevational view of the polarized light rotator shown in FIG. 1.

Axially disposed on the substantially annular outer surface 18 of the polarized light rotator 14 is a stress-concentrating groove 26. The stress-concentrating groove 26 has a generally semi-circular shaped cross-section that extends from the first cross-sectional end surface 22 to the second cross-sectional end surface 24. A smooth transition exists between the stress-concentrating groove 26 and the substantially annular outer surface 18 of the polarized light rotator 14 as shown in FIG. 3. It is to be understood, however, that the stress-concentrating groove 26 may be formed of other suitable cross-sectional shapes as well.

The substantially annular inner surface 16 and the substantially annular outer surface 18 are terminated by a first rectangular surface 28 and a second rectangular surface 30. The first and second rectangular surfaces 28 and 30 extend from the first cross-sectional end surface 22 of the polarized light rotator 14 to the second cross-sectional end surface 24 of the polarized light rotator 14. As is evident from FIG. 3, the first and second rectangular surfaces 28 and 30 are disposed equidistant on opposing sides of a plane defined by the stress-concentrating groove 26 and the axial centerline 20 of the polarized light rotator 14. When the polarized light rotator 14 is at rest (i.e., when the polarized light rotator 14 is not receiving sound waves), the first and second rectangular surfaces 28 and 30 are substantially parallel and are separated by a predetermined distance.

When sound waves impinge on the substantially annular outer surface 18 of the polarized light rotator 14, there is a tendency for the distance between the first rectangular surface 28 and the second rectangular surface of the polarized light rotator 14 to decrease. The decrease in the distance between the first and second rectangular surfaces 28 and 30 is caused by the compressive force exerted by sound waves on the substantially annular outer surface 18 of the polarized light rotator 14 and causes the C-shaped cross-section to contract. Because the distance between the first rectangular surface 28 and the second rectangular surface 30 of the polarized light rotator 14 decreases when sound waves are encountered, a stress is induced in the polarized light rotator 14. The gap created by the space between the first and second rectangular surfaces 28 and 30 also prevent the polarized light rotator 14 from collapsing under extreme operating pressure by permitting the fluid medium to enter the interior of the polarized light rotator 14, thus neutralizing the compressional forces. This is particularly true when the polarized light rotator is made from a low shear modulus material.

To prevent the total loss of compliance in the polarized light rotator 14 due to the complete filling of the interior of the apparatus 10 with the fluid medium, a gas filled sealed bladder 31 may be included. The sealed bladder 31 may be disposed adjacent to the substantially annular inner surface 16 of the polarized light rotator 14 between the first and second cross-sectional end surfaces 22 and 24. When positioned in this manner, the sealed bladder 31 receives support from substantially annular inner surface 16 of the polarized light rotator 14 as well as from the polarized light source 12 and the detector 32. The sealed bladder 31 may be filled with a gas such as air, but it is to be understood that other suitable gases may be used.

Figure 4A:
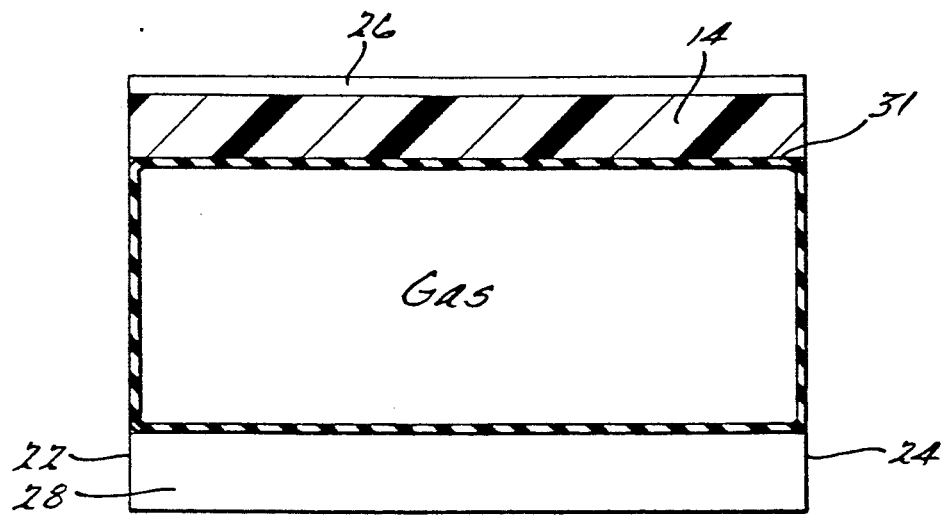
FIG. 4A–4C illustrates the operation of the sealed bladder shown in FIG. 2.
Figure 4B:
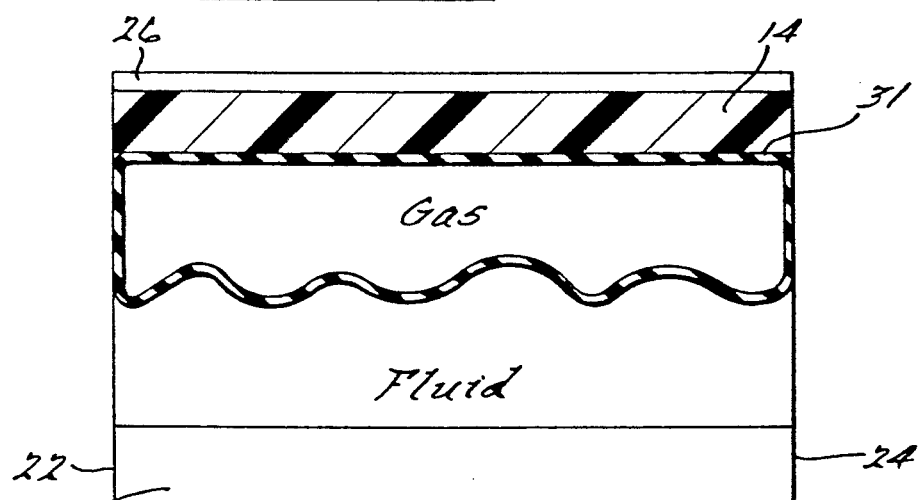
Figure 4C:
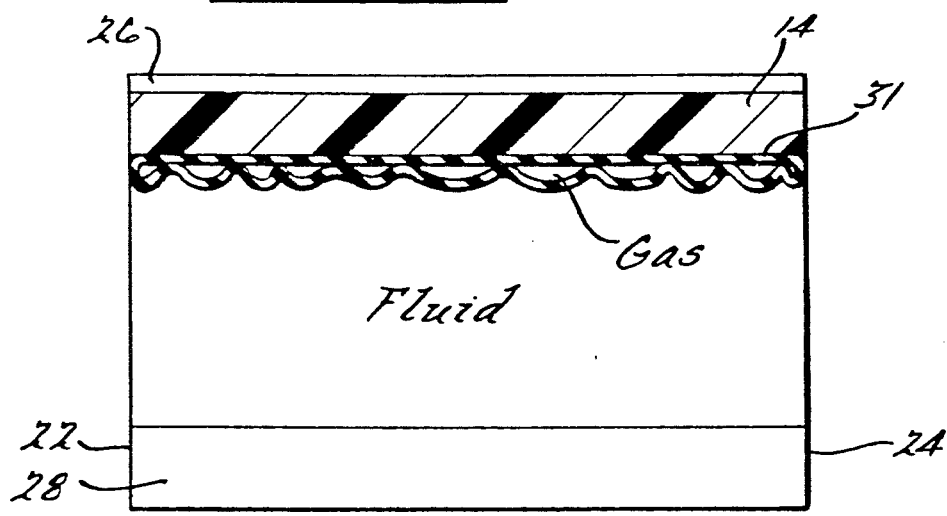

When a sealed bladder 31 is used in connection with the polarized light rotator 14, the force exerted on the substantially annular outer surface 18 by the fluid medium is substantially balanced by the force exerted by the sealed bladder 31. Accordingly, the sealed bladder 31 will maintain a compliance in the polarized light rotator 14 which may be lost if the fluid medium was allowed to completely fill the interior of the polarized light rotator 14. The shape of the sealed bladder 31 will vary depending on the depth of submergence of the polarized light rotator 14 in the fluid medium. As shown in FIG. 4A, the sealed bladder 31 is substantially adjacent to the substantially annular inner surface 16 of the polarized light rotator 14 when the polarized light rotator 14 is not disposed within the fluid medium. As shown in FIG. 4B, when the polarized light rotator 14 is shallowly disposed within the fluid medium, the force acting on the sealed bladder 31 by the fluid medium partially collapses the sealed bladder 31. Further submergence of the polarized light rotator causes a further collapse of the sealed bladder 31.

Because of the presence of the stress-concentrating groove 26 on the substantially annular outer surface 18 of the polarized light rotator 14, the stresses which are induced in the polarized light rotator 14 when the distance between the first rectangular surface 28 and the second rectangular surface 30 decreases are concentrated in the region immediately between the stress-concentrating groove 26 and the substantially annular inner surface 16. As shown in FIG. 1, the region of the polarized light rotator 14 where these stresses are concentrated is the region through which the polarized light propagates through said polarized light rotator 14. Because the polarized light rotator 14 is able to rotate the plane of polarization of the polarized light in response to stress changes, the plane of polarization of the polarized light entering the first cross-sectional end surface 22 from the polarized light source 12 is rotated before exiting the second cross-sectional end surface 24 of the polarized light rotator 14.

Figure 5A:
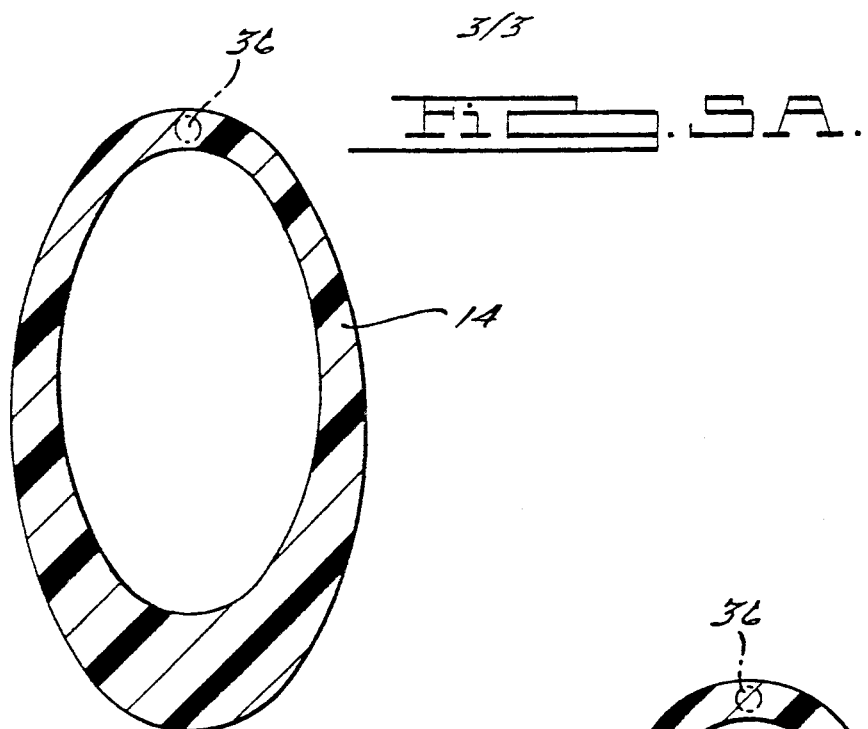
FIG. 5A–5C illustrates various alternative configurations of the polarized light rotator.
Figure 5C:
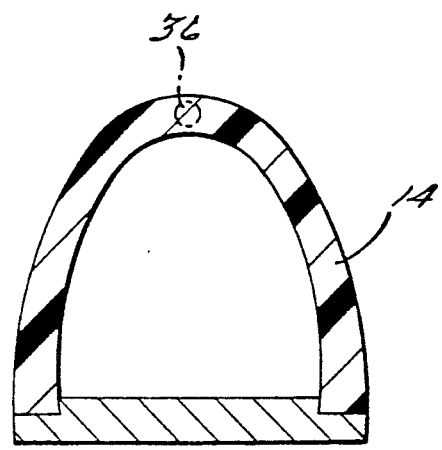
Figure 5B:
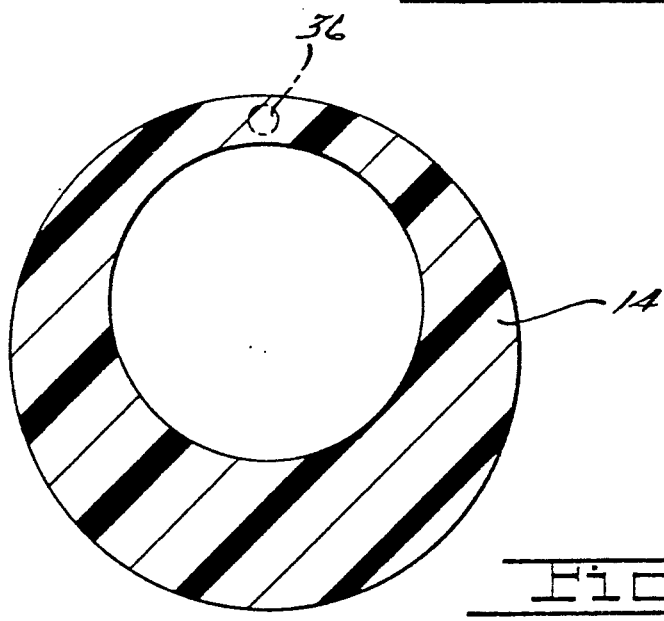

The polarized light rotator 14 may be made from a wide variety of substances which tend to rotate the plane of polarization of the polarized light in response to changes in internal stresses. For example, the polarized light rotator 14 may be made from a photoelastic material such as lucite. It is to be understood, however, that other suitable substances may be used such as cast epoxy, cast polyurethane, glass and quartz. In addition, the polarized light rotator 14 may be made of different shapes which allow internal stresses generated by sound waves to rotate the plane of polarization of polarized light passing through the polarized light rotator 14. For example, the polarized light rotator 14 may also have an inner elliptically shaped surface and an outer elliptically shaped surface as shown in FIG. 5A. When using a polarized light rotator 14 having this configuration, the path 36 of polarized light pass through a region of the polarized light rotator 14 in which the outer surface of the polarized light rotator 14 is the smallest. The polarized light rotator 14 may also have a cross-section which has a circular inner surface and a circular outer surface which are not concentric as shown in FIG. 5B. When the configuration is used, the light path 36 again passes through the region of the polarized light rotator 14 in which the interior and exterior surfaces are the closest. Further, the polarized light rotator 14 may have an arch-shaped cross-section in which the top of the arch has a smaller cross-sectional area than the bottom of the arch as shown in FIG. 5C. In this embodiment, the light path 36 passes through the top of the arch.

To provide means for detecting the amount of rotation of the plane of polarization caused by said polarized light rotator 14, a detector 32 is provided. The detector 32 is able to sense the amount of rotation of the plane of polarization of the polarized light propagating through the polarized light rotator 14 and generate an electrical signal in response thereto. The detector 32 may comprise a nicol prism with a photosensitive element, though other suitable detectors may also be used. The electrical signal generated by the detector 32 is then delivered to a system electronics unit which is generally designated by the numeral 34. The system electronics unit 34 generates an output which is responsive to the degree of rotation of the plane of polarization of the polarized light detected by the detector 32. Because the degree of rotation of the plane of polarization is determined by the pressure acting on the substantially annular outer surface 18, the output of the system electronics unit 34 is responsive to the frequency and amplitude of the sound waves propagating through the fluid medium.

The method of the preferred embodiment of the present invention will now be described. The polarized light rotator 14 is first disposed in the fluid medium. This may be accomplished by having a ship pull a plurality of the apparatus 10 which are connected in a linear array. Polarized light having a known plane of polarization is then generated by the polarized light source 12. The polarized light generated by the polarized light source 12 is then delivered to the polarized light rotator 14. The polarized light rotator 14 then rotates the plane of polarization of the polarized light in response to sound waves propagating in the fluid medium. In doing so, the stress-concentrating groove 28 concentrates the stresses induced in the polarized light rotator 14 by the sound waves in a region of the polarized light rotator 14 through which the polarized light passes (i.e., the portion of the polarized light rotator 14) which is located between the stress-concentrating groove 28 and the axial centerline of the polarized light rotator 14. The degree of rotation of the plane of polarized light is then detected by the detector 30 and measured by the systems electronics unit 34 so as to sense the sound waves propagating in the fluid medium.

Because the polarized light rotator 14 is not necessarily formed from a corrodible material, the apparatus 10 may be less susceptible to corrosion than other types of hydrophones. In addition, the apparatus 10 can operate in a relatively broad range of static and dynamic pressures due to the fact that the polarized light rotator 14 may be formed from the solid material and allows the pressure exerted on the substantially annular inner surface 16 to be equated with the pressures on the substantially annular outer surface 18 after a period of time. Further, the polarized light rotator 14 is simple in construction and therefore should avoid the need for a relatively large number of components which is typically associated with other types of hydrophones. Finally, because the polarized light rotator 14 does not generate electrical signals itself, the apparatus 10 may be used in environments where the need for security is relatively high.

It should be understood that while the present invention was described in connection with one specific embodiment, other embodiments are possible. For example, the stress-concentrating groove may be located on the substantially annular inner surface of the polarized light rotator, or may be absent if the polarized light rotator is able to rotate the plane of polarization sufficiently to detect pressure. Other modifications will become apparent to one skilled in the art upon a study of the specification, drawings, and following claims.

What is claimed is:

1. An apparatus for sensing sound waves in a fluid medium comprising:
   means for generating polarized light having a predetermined plane of polarization;
   rotational means for rotating said plane of polarization in response to said sound waves, said rotational means being disposed within said fluid medium and being substantially cylindrically shaped and having a C-shaped cross-section;
   means for detecting the amount of rotation of said plane of polarization of polarized light caused by said rotational means, said means for detecting operable to generate an output; and
   means for generating a signal from the output of said means for detecting, said signal being indicative of the frequency and amplitude of said sound waves.

2. The apparatus of claim 1, wherein rotational means is operable to generate internal stresses in response to said sound waves, said rotational means being further operable to rotate said plane of polarization of said polarized light in response to said internal stresses.

3. The apparatus of claim 2, wherein said rotational means comprise a stress-concentrating groove operable to concentrate said internal stresses of said rotational means in a predetermined portion of said rotational means.

4. The apparatus of claim 3, wherein said rotational means comprises a substantially annular inner surface and a substantially annular outer surface, said stress-concentrating groove being disposed on said substantially annular outer surface.

5. The apparatus of claim 3, wherein said rotational means comprises a substantially annular inner surface and a substantially annular outer surface, said stress-concentrating groove being disposed on said substantially annular inner surface.

6. The apparatus of claim 1, wherein said rotational means has first and second cross-sectional end surfaces, said first cross-sectional end surface being optically coupled to said means for generating polarized light, said second cross-sectional end surface being optically coupled to said means for detecting.

7. An apparatus for sensing sound waves in a fluid medium comprising:
   means for providing polarized light;
   a sensor body made of a light-transmitting material, said sensor body having a substantially annular cross-section with a longitudinal opening, polarized light from said means for providing polarized light being coupled longitudinally into said sensor body opposite the longitudinal opening;
   said sensor body deforming under compressive forces of sound waves on said sensor body in said fluid medium, the deformation of the sensor body causing stresses in said sensor body which change orientation of the polarization of said polarized light; and
   means for detecting changes in the orientation of the polarization of the polarized light caused by said stresses related to the deformation of the sensor body, the changes in the orientation of the polarization being related to the amplitude and frequency of the sound waves.

8. An apparatus as recited in claim 7 wherein said sensor body has a pressure concentrating longitudinal groove disposed opposite the longitudinal opening.

9. An apparatus as recited in claim 8 wherein said pressure concentrating longitudinal groove is disposed opposite the longitudinal opening on the outside surface of the sensor body.

10. An apparatus as recited in claim 9 further including a gas-filled bladder disposed in the cylindrically shaped interior of the substantially annular sensor body to prevent the complete filling of the cylindrically shaped interior by the fluid medium.

11. An apparatus for sensing sound waves in a fluid medium comprising:
    means for providing polarized light;
    a sensor body made of a light-transmitting material, said sensor body having a cross-sectional shape defined by an inner circle and an outer circle, said inner circle and said outer circle being nonconcentric, to concentrate stresses caused by distortion produced by compressive forces of sound waves in said fluid medium in at least one selected area of said sensor body, polarized light from said means for providing polarized light being coupled into said sensor body so that said polarized light propagates in said at least one selected area;
    said sensor body deforming under said compressive forces of sound waves on said sensor body in said fluid medium, the deformation of the sensor body causing stresses in said sensor body which change orientation of the polarization of said polarized light; and
    means for detecting changes in the orientation of the polarization of the polarized light caused by said stresses related to the deformation of the sensor body, the changes in the orientation of the polarization being related to the amplitude and frequency of the sound waves.

12. An apparatus as recited in claim 11 wherein said sensor body has a void which is coupled to the fluid medium and further including a gas-filled bladder disposed in the void to prevent the complete filling of the void by the fluid medium.

* * * * *